(12) United States Patent
Lee et al.

(10) Patent No.: US 7,832,673 B2
(45) Date of Patent: Nov. 16, 2010

(54) FLY REEL

(75) Inventors: Jae Koo Lee, Kimpo (KR); Jin-Gu Kim, Kimpo (KR)

(73) Assignee: Juho Corporation, Kimpo, Kyungki-Do (KR)

( * ) Notice: Subject to any disclaimer, the term of this patent is extended or adjusted under 35 U.S.C. 154(b) by 89 days.

(21) Appl. No.: 12/306,682

(22) PCT Filed: Sep. 2, 2006

(86) PCT No.: PCT/KR2006/003480

§ 371 (c)(1),
(2), (4) Date: Dec. 24, 2008

(87) PCT Pub. No.: WO2008/004721

PCT Pub. Date: Jan. 10, 2008

(65) Prior Publication Data

US 2010/0038463 A1 Feb. 18, 2010

(30) Foreign Application Priority Data

Jul. 4, 2006 (KR) ........................ 10-2006-0062527

(51) Int. Cl.
*A01K 89/01* (2006.01)
(52) U.S. Cl. .................... 242/317; 242/318; 242/295
(58) Field of Classification Search ............... 242/317, 242/318, 295
See application file for complete search history.

(56) References Cited

U.S. PATENT DOCUMENTS

| | | | | |
|---|---|---|---|---|
| 3,478,976 A | * | 11/1969 | Sarah | 242/270 |
| 5,556,049 A | * | 9/1996 | Bennett et al. | 242/295 |
| 5,590,847 A | * | 1/1997 | Ament | 242/317 |
| 5,915,639 A | * | 6/1999 | Farris | 242/295 |
| 6,053,445 A | * | 4/2000 | Farris | 242/303 |

(Continued)

FOREIGN PATENT DOCUMENTS

JP 14-034407 2/2002

(Continued)

*Primary Examiner*—Emmanuel M Marcelo
(74) *Attorney, Agent, or Firm*—IPLA P.A.; James E. Bame (57) ABSTRACT

This invention relates to a fly reel, of which the drag system installed in the frame thereof comprises: a drag knob that is connected rotational to one side of periphery of the center shaft that is connected fixed to hub of frame; a drag disk that is spaced-apart from said drag knob and gets inserted rotational to periphery of said center shaft; a braking means for restraining said drag disk from rotating on said center shaft in accordance with transferred amount of said drag knob moved to axial direction of said center shaft; a drag disk bush that is inserted at said drag disk for being rotated together with said drag disk as said drag disk rotates, the drag disk bush having said center shaft inserted therein; a oneway bearing that is inserted at periphery of said drag disk bush, for permitting one directional rotation but for restraining the other directional rotation; and a drag cover that is inserted rotational at periphery of said center shaft so as to be rotated by regulated rotation of said spool, for enabling said oneway bearing to rotate together as said spool rotates, thereby overall configuration can be made efficient and simple; and set direction of oneway bearing can be converted easily if necessary.

6 Claims, 5 Drawing Sheets

U.S. PATENT DOCUMENTS

| | | | |
|---|---|---|---|
| 6,209,815 B1 * | 4/2001 | Collier | 242/303 |
| 6,286,772 B1 * | 9/2001 | Koelewyn | 242/246 |
| 7,168,647 B1 * | 1/2007 | Kang | 242/303 |
| 7,431,232 B1 * | 10/2008 | Kang | 242/303 |
| 7,677,487 B2 * | 3/2010 | Lee | 242/317 |
| 2001/0038053 A1 | 11/2001 | Vashro | |
| 2002/0104912 A1 | 8/2002 | Bascue | |
| 2010/0025513 A1 * | 2/2010 | Lee | 242/295 |

FOREIGN PATENT DOCUMENTS

| | | |
|---|---|---|
| JP | 14-325530 | 11/2002 |
| KR | 10-0318717 | 12/2001 |
| KR | 10-2002-0020424 | 3/2002 |
| KR | 10-0466532 | 1/2005 |

* cited by examiner

FLY REEL

TECHNICAL FIELD

The present invention relates generally to a fly reel and more particularly to a fly reel of which spool can be easily attached to or detached from frame and drag system for controlling the rotational speed of spool has simplified configuration, thereby overall productivity thereof can be improved.

BACKGROUND ART

Generally a fly reel comprises: a spool to wind or unwind fishing line, a frame to support said spool rotational, and a drag system to control rotational speed of said spool. By rotating of a knob attached at one side of spool, the fishing line can be wound rapidly on spool, or reversely, unwinding speed of fishing line out of spool can be controlled to increase or decrease by said drag system.

Such fly reels described as above have been developed in various kinds. Proposed fly reels so far have been concentrated only on fractional improvement out of total function. Such improvements were made on, for example, connection structure between spool and frame, drag system to regulate rotational speed of spool, structure for functional conversion whereby dragging direction of spool rotation should be converted for left-handed person, generation of spool rotational noise or drag noise and cutoff system thereof, and so on. In these traditional arts, however, all of said constituting parts could not be arranged efficiently having interrelations in a narrow built-in space in either frame or spool, and therefore their configurations were made so complicated that productivity thereof was lowered, which caused problems in prior arts.

Moreover, other problems or drawbacks would be involved in case where there is a oneway bearing or ratchet gear built-in in spool or frame for conversion of dragging direction. If the set direction of said oneway bearing or ratchet gear has to be converted according to user's necessity, the drag system at first should be dismantled, the bearing or ratchet gear thereof is turned over, then inserted again into the system. Since dismantling and assembling process is complicated and troublesome to handle, it is not easy to convert the direction of drag system. Moreover, it is highly probable that wetness would penetrate into inner mechanical structure during conversion process of set direction, and so shaft-supporting part would be rusted later by the wetness. In addition, during replacing process, such parts like washer or snap ring would often pop off out by elasticity so as to be lost, and if the case is so, the user would not be able to use the fly fishing reel anymore.

DISCLOSURE OF THE INVENTION

Technical Problem

The present invention was contrived to alleviate or solve the prior-art problems and drawbacks mentioned above. It is an object of the present invention therefore to provide a fly reel of which spool can be easily attached to or detached from frame, and drag system for controlling the rotational speed of spool has simplified configuration and higher accuracy in drag controlling, thereby overall productivity thereof can be improved and production cost thereof can be reduced.

It is another object of the present invention to provide a fly reel wherein set direction of oneway bearing built-in in drag system can be converted easily without any possibility of other parts or accessories to be lost.

Technical Solution

In order to achieve the objects described as above, the fly reel according to the present invention comprises: a frame that is furnished with a hub at center, a center shaft that is connected fixed to said hub of frame, a spool that is connected rotational to said center shaft for winding or unwinding the fishing line, and a drag system that is connected to said center shaft for controlling the rotational speed of said spool, wherein said drag system comprises: a drag knob that is connected rotational to one side of periphery of said center shaft; a drag disk that is spaced-apart from said drag knob and gets inserted rotational to periphery of said center shaft; a braking means for restraining said drag disk from rotating on said center shaft in accordance with transferred amount of said drag knob moved to axial direction of said center shaft; a drag disk bush that is inserted at said drag disk for being rotated together with said drag disk as said drag disk rotates, the drag disk bush having said center shaft inserted therein; a oneway bearing that is inserted at periphery of said drag disk bush, for permitting one directional rotation but for restraining the other directional rotation; and a drag cover that is inserted rotational at periphery of said center shaft so as to be rotated by regulated rotation of said spool, for enabling said oneway bearing to rotate together as said spool rotates.

Said center shaft preferably comprises: a No. 1 part that is fixed connected at hub of said frame; and a No. 2 part that is formed extended from one end of said No. 1 part in such a manner that said No. 2 part can be separated from or connected to said No. 1 part, the No. 2 part being formed at one side of periphery thereof with a flange for restraining said drag disk bush from moving to axial direction.

Said drag disk bush is preferably formed at periphery thereof with a flange, and formed extended from said flange with a No. 1 extension part and a No. 2 extension part, in such a manner that the two extension parts are extended opposite each other from the flange to axial direction, wherein the No. 1 extension part is formed at its periphery with an angular part for getting said drag disk inserted therein, and the No. 2 extension part is inserted at its periphery by said oneway bearing.

Said braking means preferably comprises: a pressure plate that is inserted at periphery of said center shaft, in such a manner that the pressure plate is movable to axial direction of said center shaft but fixed to radial direction; and a drag washer that is inserted at periphery of said center shaft, in such a manner that the drag washer is adjacent to said pressure plate and movable to axial direction of said center shaft.

Said drag cover is inserted at periphery of said center shaft in such a manner that the oneway bearing located therein and braking means are not be exposed outside, wherein said drag cover is formed at one open end thereof with a flange for securing tight contact with the hub of said frame, and inserted at the other end thereof with a screw for keeping said drag cover from escaping outside as well as for closing the end of said center shaft.

Advantageous Effect

According to the fly reel of the present invention, spool can be attached to or detached from the frame conveniently, and the drag system for controlling the rotational speed of spool has simpler configuration and can secure higher accuracy of drag controlling so as to enhance productivity thereof and reduce production cost. Furthermore, according to the fly reel of the present invention, set direction of built-in oneway bearing in the drag system can be converted easily without possibility in other parts or accessories to be lost.

BEST MODE FOR CARRYING OUT THE INVENTION

Hereinafter, the fly reel according to preferable embodiments of the present invention will be described with reference to appended drawings.

Figure 1:
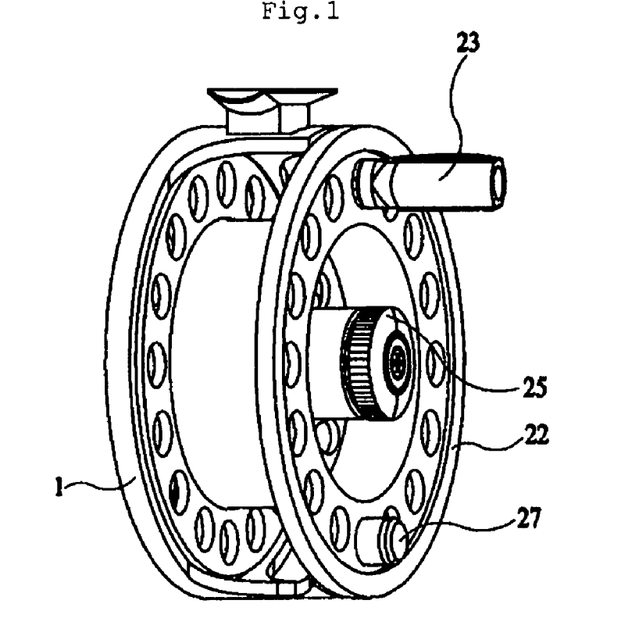
FIG. 1 is a perspective view of the fly reel according to the present invention.
Figure 2:
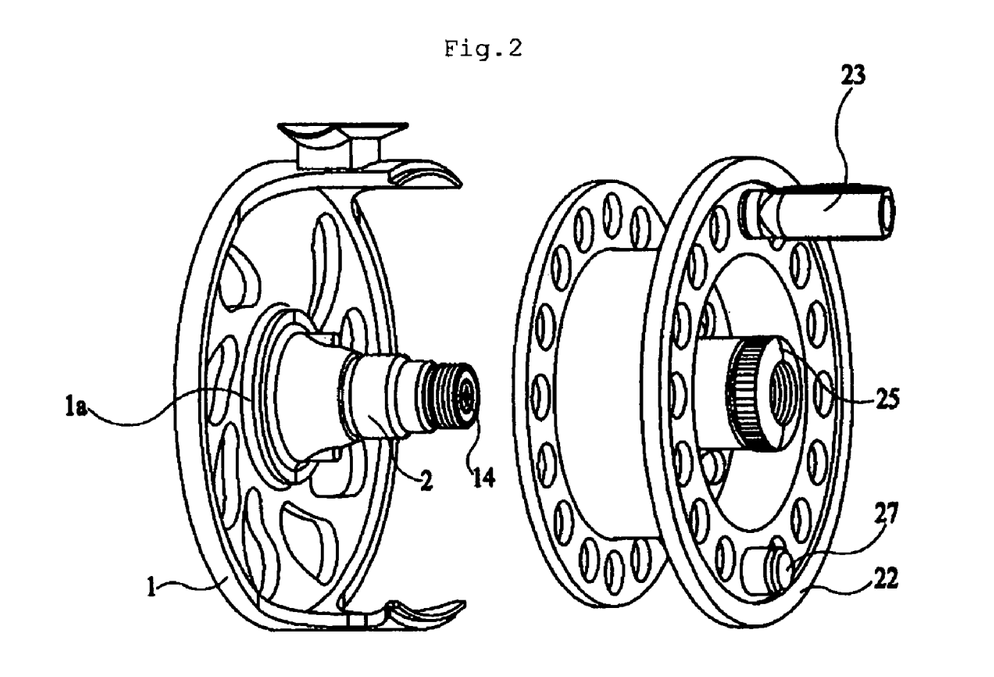
FIG. 2 is an exploded view of the state where spool has been separated from frame in the fly reel according to the present invention.

Referring to FIGS. 1 & 2, the fly reel according to the present invention comprises a frame 1 that is furnished with a hub 1a at center, a center shaft that is connected fixed to said hub 1a of frame 1, a spool 22 that is connected rotational to said center shaft, for winding or unwinding the fishing line, and a drag system that is connected to said center shaft, for controlling the rotational speed of said spool 22.

Figure 3:
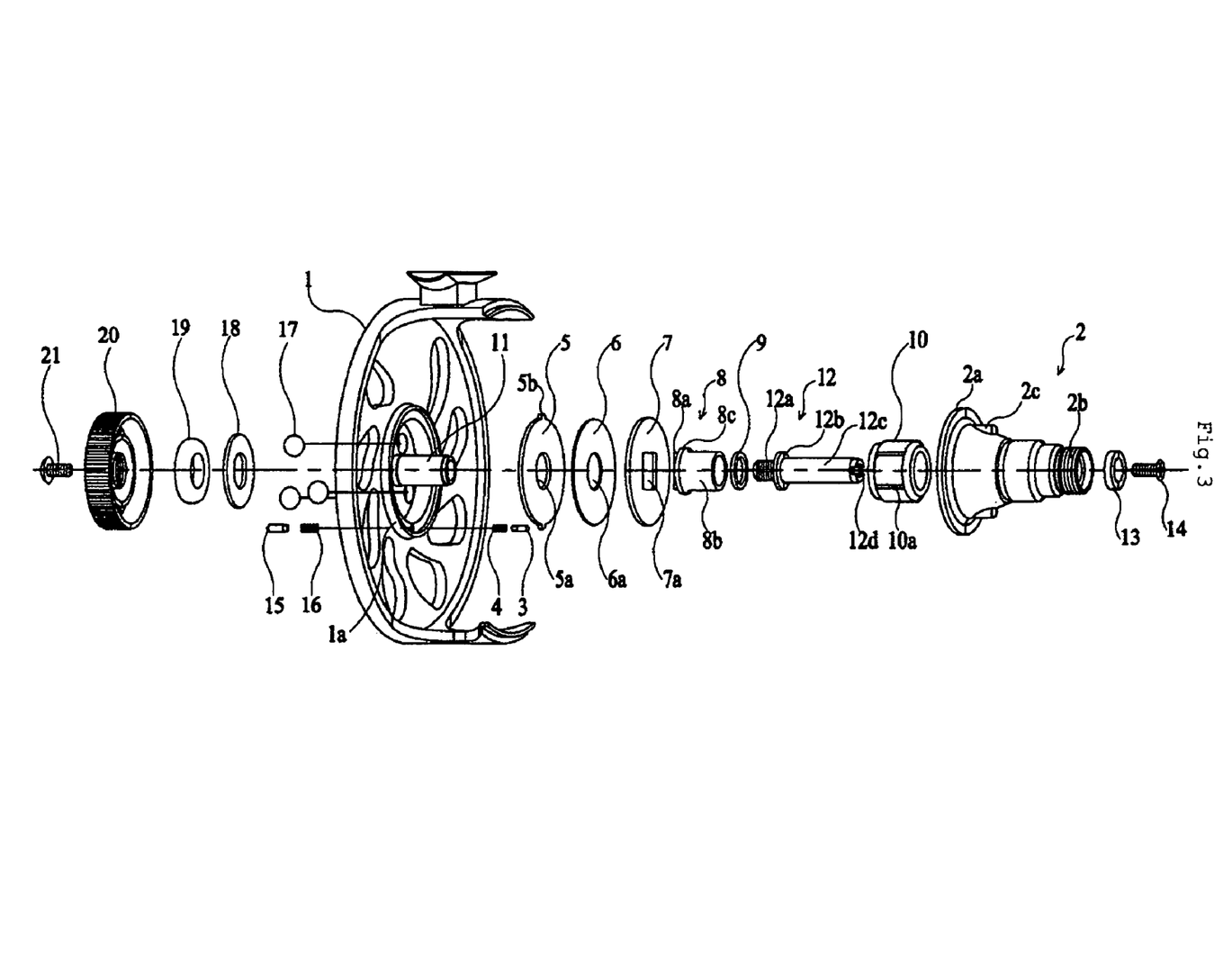
FIG. 3 is an exploded perspective view of frame and drag system in the fly reel according to the present invention.
Figure 5:
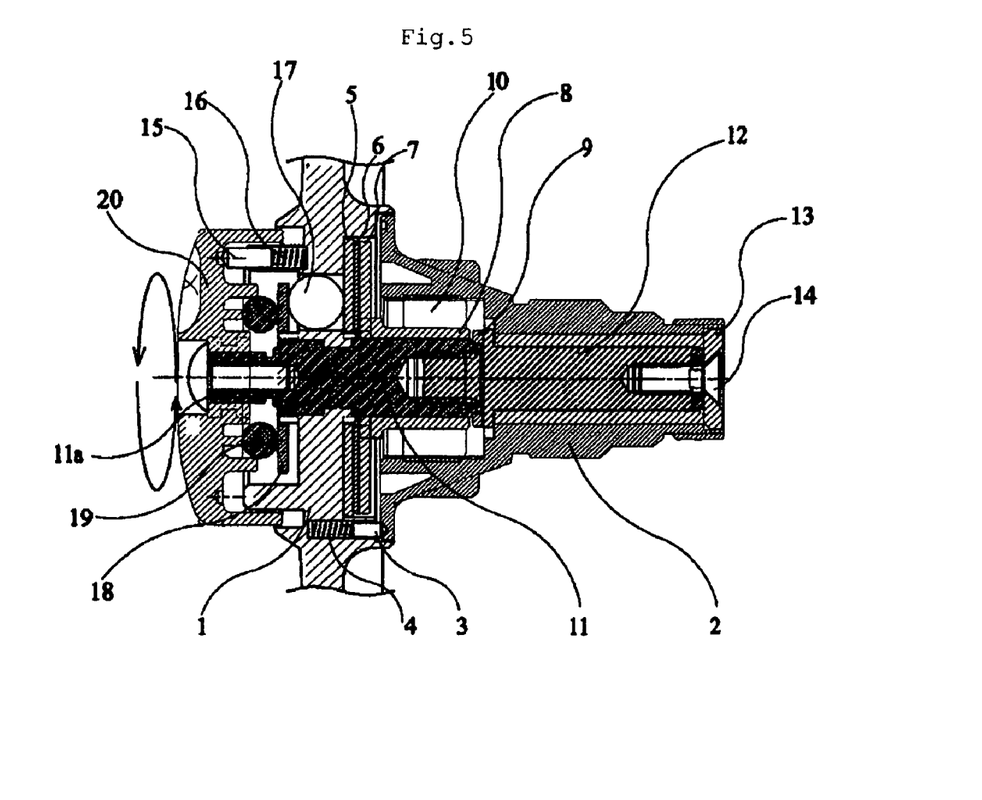
FIG. 5 is a cross sectional view of the state before drag works in the fly reel according to the present invention.
Figure 6:
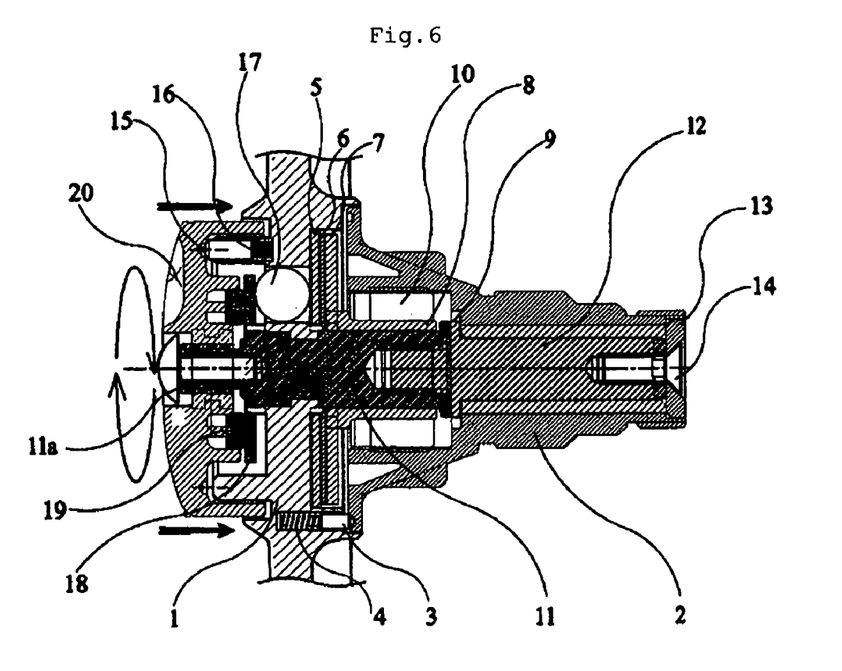
FIG. 6 is a cross sectional view of the state after drag works in the fly reel according to the present invention.

Referring to FIGS. 3, 5 & 6, said center shaft comprises a No. 1 part 11 that is fixed connected at hub 1a of said frame 1 and a No. 2 part 12 that is formed extended from one end of said No. 1 part 11 in such a manner that said No. 2 part is capable of being separated from or connected to said No. 1 part.

Said No. 2 part 12 is formed: at one end thereof with a screw part 12a in order to be capable of connecting with said No. 1 part 11; at one end of periphery thereof with a flange 12b adjacently to said screw part 12a in order to restrain the drag disk bush 8, that will be described later, from moving to axial direction; and at the other end thereof with a screw joint hole 12d in order to prevent the drag cover 2, that will be described later, from breaking away.

In case where the center shaft is to be formed in No. 1 part 11 and No. 2 part 12 as described above, firstly the No. 1 part 11 is formed fixed at frame 1. And then, at a state where a braking means (that is, pressure plate 5 and drag washer 6) which will be described later, a drag disk 7, and a drag disk bush 8 has been made inserted at periphery of No. 1 part 11, the No. 2 part 12 is made screw-connected with an end of said No. 1 part 11. Unexplained numeral 9 is washer.

By the way, in case where the center shaft is to be formed as one body differently from above description: at a state where a braking means (that is, pressure plate 5 and drag washer 6) which will be described later, a drag disk 7, and a drag disk bush 8 has been made inserted at periphery of center shaft, the center shaft is made inserted into hub 1a of frame 1, and then center shaft and frame 1 can be formed fixed by a fixing means like nut (not shown). Or otherwise, at a state where center shaft has been inserted at center of frame 1, the frame 1 is injection-molded at periphery of center shaft so as to form one body.

Figure 4:
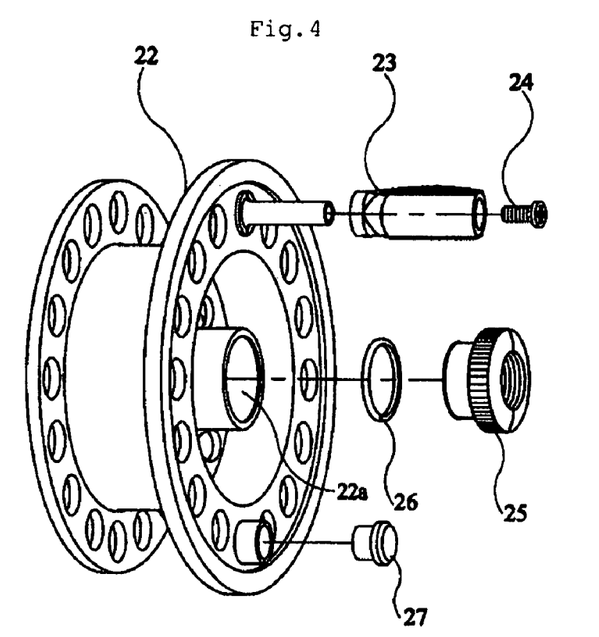
FIG. 4 is an exploded perspective view of spool in the fly reel according to the present invention.

Referring to FIGS. 2 & 4, said spool 22 is formed at center thereof with a shaft hole 22a. Said shaft hole 22a is inserted by spool joint nut 25 for connecting with drag cover 2 that will be described later, and formed at one side thereof with a knob 23 for winding or unwinding the fishing line. Unexplained numeral 24 stands for knob screw, 26 for O-ring, and 27 for balance.

Referring to FIGS. 3, 5 & 6, said drag system, being connected at center shaft, functions to regulate or restrain the rotational speed of said spool 22, and comprises a drag knob 20, a drag disk 7, a braking means, a drag disk bush 8, a oneway bearing 10, and a drag cover 2.

Said drag knob 20 is screw-connected rotational to screw part 11a formed at periphery of one side of said center shaft. Rotating of said drag knob 20 compresses O-ring 19 that remains inserted therein, then pressing force thereof is transferred to push plate 18 so as to enable push balls 17 that remains inserted therein to move to axial direction of center shaft. Unexplained numeral 15 stands for drag knob clicker, 16 for spring, and 21 for drag knob screw.

Said drag disk 7 is inserted rotational, and spaced-apart from said drag knob 20 at periphery of said center shaft. Depending whether or not braking applies at braking means that will be described later; rotating of said drag disk 7 is free or restrained on said center shaft. Said drag disk 7 is formed at its center with a hole of angular part 7a, for example rectangular part, which is similar to the shape of periphery of said No. 1 extension part 8a, in order that the angular part formed at No. 1 extension part 8a of drag disk bush 8 that will be described later can be inserted therein.

Referring to FIGS. 3, 5 & 6, said braking means comprises a pressure plate 5 and a drag washer 6 and functions to restrain said drag disk 7 from rotating on said center shaft according to transferred amount of said drag knob 20 moved to axial direction of said center shaft.

Said pressure plate 5 is formed at center thereof with a hole 5a whose diameter is bigger than outer diameter of said center shaft so as to enable said pressure plate 5 to move to axial direction of said center shaft at periphery of said center shaft; and at periphery thereof with protruding parts 5b each up each down that is to be inserted into the groove formed inside of hub 1a of frame 1. And thereby, said pressure plate 5 gets inserted on periphery of center shaft so as to be capable of moving to axial direction of center shaft but to be fixed to radial direction.

Said drag washer 6 is formed at center thereof with a hole 6a whose diameter is bigger than outer diameter of said center shaft so as to be inserted movable to axial direction of said center shaft, adjacent to said pressure plate 5 at periphery of said center shaft.

Said drag disk bush 8 gets inserted at angular part 7a formed at center of said drag disk 7. So, when said drag disk 7 rotates, said drag disk bush 8 rotates with said drag disk 7 on center shaft inserted therein. Said drag disk bush 8 is formed at periphery thereof with a flange 8c and formed extended from the flange 8c with a No. 1 extension part 8a and a No. 2 extension part 8b, in such a manner that the two extension parts 8a and 8b are extended opposite each other from the flange 8c to axial direction.

Said No. 1 extension part 8a is formed at its periphery with an angular part corresponding to the angular part 7a formed at center of said drag disk 7; said No. 2 extension part 8b is inserted at its periphery by said oneway bearing 10. Said flange 8c functions as a stopper for preventing said drag disk 7 from moving to axial direction.

So far, said drag disk bush 8 has been described as a constituent separated from said drag disk 7. Yet, said drag disk bush 8 with said drag disk 7 can form as one body; this kind of variation also belongs to the scope of the present invention.

Figure 7:
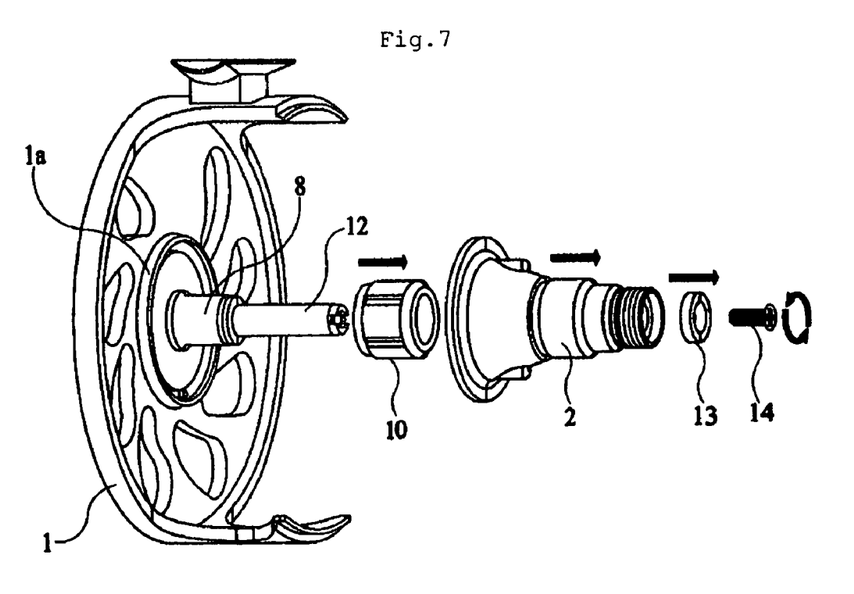
FIG. 7 is an explanatory drawing to describe conversion of drag direction in the fly reel according to the present invention.
Figure 8:
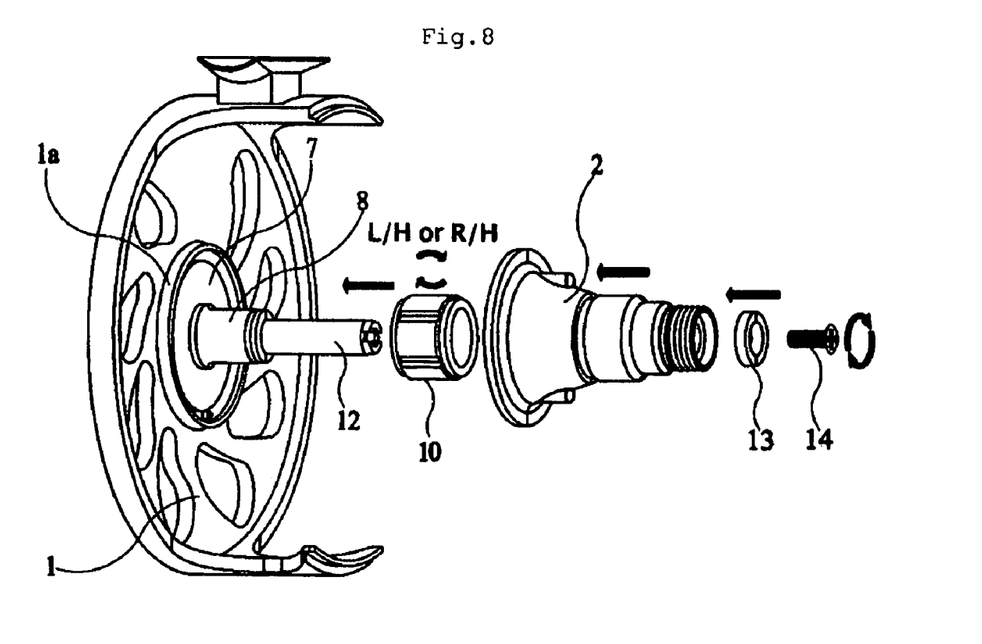
FIG. 8 is an explanatory drawing to describe conversion of drag direction in the fly reel according to the present invention.

Referring to FIGS. 3, 7 & 8, said oneway bearing 10 is inserted at periphery of said drag disk bush 8 so that rotation thereof to a direction is permitted but rotation thereof to reverse direction is restrained, and is formed at periphery thereof with an angular part 10a so as to enable a drag cover 2, that will be described later, to rotate together.

At this time, if direction of setting is altered to which said oneway bearing 10 is inserted at periphery of drag disk bush 8, permitted direction and restrained direction thereof are altered accordingly.

Said drag cover 2, being inserted rotational at periphery of said center shaft, can be rotated by regulated rotation of said spool 22 and has an angular part formed therein corresponding to the angular part 10a formed at periphery of said oneway bearing 10 in order for said oneway bearing 10 to rotate together as said spool 22 rotates.

In addition, said drag cover 2 is inserted at periphery of said center shaft in such a manner that the oneway bearing 10 located therein and braking means are not be exposed outward, wherein said drag cover 2 is formed at one open end thereof with a flange 2a for securing tight contact with the hub 1a of said frame 1, and inserted at the other end thereof with a screw 14 for keeping said drag cover 2 from escaping outward as well as for closing the end of said center shaft. Then, inside of said drag cover 2 becomes isolated from atmosphere, so that it is possible to prevent humidity from penetrating into inside of said drag cover 2. Unexplained numeral 2b stands for screw part to be joined with spool joint nut, 2c for prominence for conjugating spool with drag cover to move together, 3 for clicker, 4 for clicker spring, and 13 for drag cover retainer.

In the fly reel according to the present invention comprising as in above description, referring to FIG. 5 for a state before drag applies on drag disk 7: this is a state where the drag knob 20 connected at one side of frame 1 has been released counterclockwise completely and so moved to left seen from axial direction of center shaft. Under this state, pressure O-ring 19 does not have any external force applied thereon and is uncompressed, accordingly push ball 17 locates at left, adjacent braking means (that is, pressure plate 5 and drag washer 6) does not have any external force applied thereon, drag disk 7 has no external force applied thereon, and therefore, said drag disk 7 is free for both clockwise and counterclockwise rotation on center shaft.

By the way, drag disk bush 8 conjugated with drag disk 7 in rotating, is inserted at periphery thereof by a oneway bearing 10. Said oneway bearing 10 on periphery of said drag disk bush 8 is free for rotation of one direction but restrained from rotation of reverse direction.

Under this state as above where said spool 22 and drag cover 2 are joined by a spool joint nut 25, and drag cover 2 and oneway bearing 10 are joined by connection of angular part: if a user rotates the spool 22 to a direction for which the rotation of said oneway bearing 10 is free, said spool 22 can rotate freely so as to make oneway bearing 10 rotate with no resistance through drag cover 2. On the other hand, if the user rotates spool 22 to a direction for which the rotation of said oneway bearing 10 is not free, the rotational force of spool 22 reaches via drag cover 2 to rotational direction of oneway bearing 10. Although oneway bearing 10 is restrained from rotating on periphery of drag disk bush 8, rotational force affected on oneway bearing 10 from rotation of spool 22 is bigger than this restraining force. Accordingly the spool 22 can rotate on center shaft, making both said drag disk bush 8 and drag disk 7 rotational.

Therefore, at a state as above before drag is applied on drag disk 7, a user can freely rotate the spool 22 to any direction of right or left as he or she wants to.

But, referring to FIG. 6, if the user turns drag knob 20 from above-said state to clockwise direction, the drag knob 20 comes to move on center shaft to right so as to compress pressure O-ring 19, accordingly push ball 17 moves to right, braking means (that is, pressure plate 5 and drag washer 6) is compressed, and then compressed pressure plate 5 and drag washer 6 deliver compression force to drag disk 7 so that said drag disk 7 gets restrained from its rotating on center shaft.

At the time when said drag disk 7 is braked, the drag disk bush 8 inserted within said drag disk 7 is also braked and not free to rotate to either direction on center shaft. At this state, oneway bearing 10 inserted at periphery of said drag disk bush 8 is free to rotate to one direction but not free to rotate to the other direction.

Under this state, if the user rotates spool 22 to a direction where said oneway bearing 10 can freely rotate: the oneway bearing 10 inserted at angular part formed in said drag cover 2 is free to rotate on periphery of drag disk bush 8, when drag cover 2 combined with said spool 22 rotates. Therefore the spool 22 is free to rotate. But, on the other case when user rotates spool 22 to a direction where said oneway bearing 10 cannot rotate freely, the drag cover 2 combined with said spool 22 is restrained from its rotating because of oneway bearing 10. Accordingly the spool 22 is also restrained from rotating on center shaft.

Therefore, at a state where drag has been applied on drag disk 7 as in above description, spool 22 is free to rotate to a direction but restrained from its rotating to reverse direction according to the degree of applied drag.

By the way, said oneway bearing 10 alters permissible rotational direction thereof according to the direction by which said oneway bearing 10 gets inserted at said drag disk bush 8. In case for left-hand user, leftward rotation of oneway bearing 10 is always free; rightward rotation thereof is free when drag is not applied, but limited or restrained when drag is applied. In case for right-hand user, rightward rotation of oneway bearing 10 is always free; leftward rotation thereof is free when drag is not applied, but limited or restrained when drag is applied.

Therefore, if dragging direction is to be converted according to rotational direction of spool 22, firstly referring to FIG. 1, spool joint nut 25 of spool 22 is released; referring to FIG. 2, said frame 22 gets separated from frame 1; referring to FIG. 7, the screw 14 inserted at end of drag cover 2 is released and drag cover 2 is drawn out; then, oneway bearing 10 inserted at periphery of drag disk bush 8 is seen outside; at this state, said oneway bearing 10 is taken out from drag disk bush 8 and overturned; referring to FIG. 8, oneway bearing 10 is assembled in reverse order at drag disk bush 8, so in this way, dragging direction following the rotational direction of spool 22 can be easily converted in consideration of user's mode whether the user is left-handed or right-handed.

While the present invention has been described herein with reference to the preferred embodiments illustrated in appended drawings thereof which are however furnished herein for description purpose, it will be apparent to those skilled in the art that various modifications, variations and equivalent embodiments or examples can be made without departing from the spirit and scope of the invention. Therefore, it is intended that the present invention covers the modifications, variations and equivalent embodiments or examples of this invention that come within the scope of the appended claims and their equivalents.

INDUSTRIAL APPLICABILITY

In the fly reel according to the present invention as has been described herein, the spool can be easily attached to or detached from frame, drag system for controlling the rotational speed of spool has simplified configuration, and preciseness in regulated dragging is enhanced, thereby overall productivity thereof can be improved and production cost thereof reduced. Moreover, set direction of the oneway bearing built-in in drag system can be converted easily without possibility of other parts or constituents to be lost.

What is claimed is:

1. A fly reel comprising: a frame (1) that is furnished with a hub (1a) at center, a center shaft that is fixedly connected to said hub (1a) of said frame (1), a spool (22) that is rotatedly connected to said center shaft for winding or unwinding the fishing line, and a drag system that is connected to said center shaft for controlling the rotational speed of said spool (22), wherein said drag system comprises:
    a drag knob (20) that is rotatedly connected to one side of a periphery of said center shaft;
    a drag disk (7) that is spaced-apart from said drag knob (20) and gets a inserted rotational to said periphery of said center shaft;
    a braking means for restraining said drag disk (7) from rotating on said center shaft in accordance with a transferred amount of said drag knob (20) moved to an axial direction of said center shaft;
    a drag disk bush (8) that is inserted at said drag disk (7) for being rotated together with said drag disk (7) as said drag disk (7) rotates, the drag disk bush (8) having said center shaft inserted therein;
    a one way bearing (10) that is inserted at a periphery of said drag disk bush (8), for permitting one directional rotation but for restraining the other directional rotation; and
    a drag cover (2) that is inserted rotational at said periphery of said center shaft so as to be rotated by regulated rotation of said spool (22), for enabling said one way bearing (10) to rotate together as said spool (22) rotates.

2. The fly reel according to claim 1, wherein said center shaft comprises:
    a No. 1 part that is fixedly connected at a hub (1a) of said frame 1; and
    a No. 2 part that is formed extended from one end of said No. 1 part (11) in such a manner that said No. 2 part can be separated from or connected to said No. 1 part, the No. 2 part being formed at one side of periphery thereof with a flange (12b) for restraining said drag disk bush (8) from moving to an axial direction.

3. The fly reel according to claim 1, wherein said drag disk bush (8) is formed at the periphery thereof with a flange (8c), and formed extending from the flange (8c) with a No. 1 extension part (8a) and a No. 2 extension part (8b), in such a manner that the two extension parts (8a and 8b) are extended opposite each other from the flange (8c) to an axial direction, wherein the No. 1 extension part (8a) is formed at its periphery with an angular part for getting said drag disk (7) inserted therein, and the No. 2 extension part (8b) is inserted at its periphery by said one way bearing (10).

4. The fly reel according to claim 1, wherein said drag disk (7) and said drag disk bush (8) are formed as one body.

5. The fly reel according to claim 1, wherein said braking means comprises:
    a pressure plate (5) that is inserted at the periphery of said center shaft, the pressure plate being movable to an axial direction of said center shaft but fixed to a radial direction; and
    a drag washer (6) that is inserted at the periphery of said center shaft, the drag washer being adjacent to said pressure plate (5) and movable to the axial direction of said center shaft.

6. The fly reel according to claim 1, wherein said drag cover (2) is inserted at the periphery of said center shaft in such a manner that the one way bearing (10) located therein and braking means are not be exposed outside, the drag cover (2) being formed at one open end thereof with a flange (2a) for securing tight contact with the hub (1a) of said frame (1), and being inserted at the other end thereof with a screw (14) for keeping aid drag cover (2) from escaping out as well as for closing the end of said center shaft.

* * * * *